(12) United States Patent
Okamoto

(10) Patent No.: US 9,224,514 B2
(45) Date of Patent: *Dec. 29, 2015

(54) CATHODE ACTIVE MATERIAL FOR LITHIUM ION BATTERY, CATHODE FOR LITHIUM ION BATTERY, AND LITHIUM ION BATTERY

(71) Applicant: JX Nippon Mining & Metals Corporation, Chiyoda-ku, Tokyo (JP)

(72) Inventor: Kentaro Okamoto, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/364,795

(22) PCT Filed: Sep. 21, 2012

(86) PCT No.: PCT/JP2012/074263
§ 371 (c)(1),
(2) Date: Jun. 12, 2014

(87) PCT Pub. No.: WO2013/111378
PCT Pub. Date: Aug. 1, 2013

(65) Prior Publication Data
US 2014/0306152 A1  Oct. 16, 2014

(30) Foreign Application Priority Data

Jan. 26, 2012  (JP) ................. 2012-014153

(51) Int. Cl.
| | |
|---|---|
| *H01B 1/08* | (2006.01) |
| *H01M 4/505* | (2010.01) |
| *H01M 4/525* | (2010.01) |
| *H01M 4/485* | (2010.01) |
| *C01G 45/12* | (2006.01) |
| *C01G 51/00* | (2006.01) |
| *C01G 53/00* | (2006.01) |
| *H01M 10/052* | (2010.01) |

(52) U.S. Cl.
CPC .............. *H01B 1/08* (2013.01); *C01G 45/1228* (2013.01); *C01G 51/50* (2013.01); *C01G 53/42* (2013.01); *C01G 53/50* (2013.01); *H01M 4/485* (2013.01); *H01M 4/505* (2013.01); *H01M 4/525* (2013.01); *C01P 2002/52* (2013.01); *C01P 2006/40* (2013.01); *C01P 2006/82* (2013.01); *H01M 10/052* (2013.01); *Y02E 60/122* (2013.01)

(58) Field of Classification Search
CPC ..... H01M 4/505; H01M 4/525; H01M 4/485; H01M 10/052; H01B 1/08; C01G 51/50; C01G 53/50; C01G 53/42; C01G 53/006; C01G 45/1228; Y02E 60/122; C01P 2006/82
See application file for complete search history.

(56) References Cited

U.S. PATENT DOCUMENTS

| | | |
|---|---|---|
| 2,165,128 A | 7/1939 | Cheesman |
| 4,443,186 A | 4/1984 | Shell |
| 4,462,793 A | 7/1984 | Maeda et al. |
| 4,469,654 A | 9/1984 | Haskett et al. |
| 5,393,622 A | 2/1995 | Nitta et al. |
| 5,478,674 A | 12/1995 | Miyasaka |
| 5,759,714 A * | 6/1998 | Matsufuji et al. ............. 429/336 |
| 6,037,095 A | 3/2000 | Miyasaka |
| 6,123,911 A | 9/2000 | Yamaguchi et al. |
| 6,423,447 B1 | 7/2002 | Ohsaki et al. |
| 6,582,854 B1 | 6/2003 | Qi et al. |
| 6,984,469 B2 | 1/2006 | Kweon et al. |
| 7,332,248 B2 * | 2/2008 | Kase et al. ................. 429/231.3 |
| 7,410,728 B1 | 8/2008 | Fujimoto et al. |
| 7,645,542 B2 * | 1/2010 | Kase et al. ................. 429/231.1 |
| 8,354,191 B2 | 1/2013 | Shizuka et al. |
| 8,623,551 B2 | 1/2014 | Kawahashi et al. |
| 8,748,041 B2 | 6/2014 | Satoh et al. |
| 8,993,160 B2 | 3/2015 | Nagase |
| 9,090,481 B2 | 7/2015 | Satoh |
| 2002/0106561 A1 | 8/2002 | Lee et al. |
| 2003/0082448 A1 | 5/2003 | Cho et al. |
| 2003/0104279 A1 | 6/2003 | Miyazaki et al. |
| 2003/0126803 A1 | 7/2003 | Rosenflanz |
| 2003/0211391 A1 | 11/2003 | Cho et al. |
| 2004/0053134 A1 | 3/2004 | Ozaki et al. |
| 2004/0110063 A1 | 6/2004 | Uchitomi et al. |

(Continued)

FOREIGN PATENT DOCUMENTS

| | | |
|---|---|---|
| CN | 1520621 A | 8/2004 |
| CN | 1701451 A | 11/2005 |

(Continued)

OTHER PUBLICATIONS

Machine Translation of JP 2007-257890 A, Ito et al.*
Wikipedia—Karl Fischer Titration Article (Waybackmachine.com snapshot dtd. Sep. 12, 2010).*
English Machine Translation of JP 09-082325 A, Mori K., published Mar. 1997.*
English Machine Translation of JP 10-334919 A, Yamazaki et al., published Dec. 1998.*
International Preliminary Report on Patentability mailed Jul. 31, 2014 in corresponding PCT application No. PCT/JP2012/074263.
International Preliminary Report on Patentability mailed Jul. 31, 2014 in co-pending PCT application No. PCT/JP2012/074266.

(Continued)

*Primary Examiner* — Mark Kopec
*Assistant Examiner* — Matthew R Diaz
(74) *Attorney, Agent, or Firm* — Nields, Lemack & Frame, LLC

(57) ABSTRACT

There is provided a cathode active material for a lithium ion battery having good battery properties. The cathode active material for a lithium ion battery is represented by a composition formula: $Li_xNi_{1-y}M_yO_{2+\alpha}$ wherein M is one or more selected from Sc, Ti, V, Cr, Mn, Fe, Co, Cu, Zn, Ga, Ge, Al, Bi, Sn, Mg, Ca, B, and Zr; $0.9 \le x \le 1.2$; $0 < y \le 0.7$; and $\alpha > 0.1$, and has a moisture content measured by Karl Fischer titration at 300° C. of 1100 ppm or lower.

13 Claims, No Drawings

(56) References Cited

U.S. PATENT DOCUMENTS

| | | |
|---|---|---|
| 2004/0197658 A1 | 10/2004 | Kase et al. |
| 2005/0079416 A1 | 4/2005 | Ohzuku et al. |
| 2005/0142442 A1 | 6/2005 | Yuasa et al. |
| 2005/0158546 A1 | 7/2005 | Shizuka |
| 2006/0083989 A1 | 4/2006 | Suhara et al. |
| 2006/0121350 A1 | 6/2006 | Kajiya et al. |
| 2006/0127765 A1 | 6/2006 | Machida et al. |
| 2006/0204849 A1 | 9/2006 | Saito et al. |
| 2006/0233696 A1 | 10/2006 | Paulsen et al. |
| 2006/0281005 A1 | 12/2006 | Cho et al. |
| 2007/0015058 A1 | 1/2007 | Takezawa et al. |
| 2007/0141469 A1 | 6/2007 | Tokunaga et al. |
| 2007/0202405 A1 | 8/2007 | Shizuka et al. |
| 2007/0248883 A1 | 10/2007 | Oda et al. |
| 2007/0298512 A1 | 12/2007 | Park et al. |
| 2008/0044736 A1 | 2/2008 | Nakura |
| 2008/0081258 A1 | 4/2008 | Kim et al. |
| 2009/0117464 A1 | 5/2009 | Cho et al. |
| 2009/0117469 A1 | 5/2009 | Hiratsuka et al. |
| 2009/0148772 A1 | 6/2009 | Kawasato et al. |
| 2009/0233176 A1 | 9/2009 | Kita et al. |
| 2009/0286164 A1 | 11/2009 | Wada et al. |
| 2009/0289218 A1 | 11/2009 | Kajiya et al. |
| 2009/0299922 A1 | 12/2009 | Malcus et al. |
| 2009/0305136 A1 | 12/2009 | Yada et al. |
| 2010/0015514 A1 | 1/2010 | Miyagi et al. |
| 2010/0019194 A1 | 1/2010 | Fujiwara et al. |
| 2010/0112447 A1 | 5/2010 | Yamamoto et al. |
| 2010/0136412 A1 | 6/2010 | Watanabe |
| 2010/0143583 A1 | 6/2010 | Honda et al. |
| 2010/0183922 A1 | 7/2010 | Cho et al. |
| 2010/0209757 A1 | 8/2010 | Ooyama et al. |
| 2010/0209771 A1 | 8/2010 | Shizuka et al. |
| 2010/0227222 A1 | 9/2010 | Chang et al. |
| 2011/0031437 A1 | 2/2011 | Nagase et al. |
| 2011/0033749 A1 | 2/2011 | Uchida et al. |
| 2011/0076558 A1 | 3/2011 | Miyazaki et al. |
| 2011/0250499 A1 | 10/2011 | Hiratsuka |
| 2012/0034525 A1 | 2/2012 | Satoh et al. |
| 2012/0231342 A1 | 9/2012 | Satoh et al. |
| 2012/0231343 A1 | 9/2012 | Nagase et al. |
| 2012/0244434 A1 | 9/2012 | Nagase |
| 2012/0292562 A1 | 11/2012 | Kajiya et al. |
| 2012/0319036 A1 | 12/2012 | Kajiya et al. |
| 2012/0319037 A1 | 12/2012 | Kawahashi et al. |
| 2012/0319039 A1 | 12/2012 | Satoh |
| 2012/0319040 A1 | 12/2012 | Okamoto et al. |
| 2012/0321956 A1 | 12/2012 | Kawahashi et al. |
| 2012/0326080 A1 | 12/2012 | Okamoto et al. |
| 2012/0326098 A1 | 12/2012 | Satoh |
| 2012/0326099 A1 | 12/2012 | Satoh |
| 2012/0326101 A1 | 12/2012 | Satoh |
| 2012/0326102 A1 | 12/2012 | Satoh |
| 2013/0001463 A1 | 1/2013 | Okamoto et al. |
| 2013/0004849 A1 | 1/2013 | Satoh |
| 2013/0043428 A1 | 2/2013 | Kawahashi et al. |
| 2013/0108921 A1 | 5/2013 | Kase et al. |
| 2013/0143121 A1 | 6/2013 | Kobayashi et al. |
| 2013/0175470 A1 | 7/2013 | Kajiya et al. |
| 2013/0221271 A1 | 8/2013 | Nagase et al. |
| 2013/0316239 A1 | 11/2013 | Okamoto |
| 2014/0339465 A1 | 11/2014 | Okamoto |
| 2014/0339466 A1 | 11/2014 | Okamoto |
| 2015/0123029 A1 | 5/2015 | Nagase et al. |
| 2015/0188134 A1 | 7/2015 | Kameyama et al. |

FOREIGN PATENT DOCUMENTS

| | | | |
|---|---|---|---|
| CN | 1710735 A | | 12/2005 |
| CN | 1947288 A | | 4/2007 |
| CN | 101478044 A | | 7/2009 |
| EP | 0794155 A1 | | 9/1997 |
| EP | 0903796 A1 | | 3/1999 |
| EP | 1244164 A1 | | 9/2002 |
| EP | 1317008 A2 | | 6/2003 |
| EP | 1391950 A1 | | 2/2004 |
| EP | 1450423 A1 | | 8/2004 |
| EP | 1742281 A1 | | 1/2007 |
| EP | 2023426 A1 | | 2/2009 |
| EP | 2207226 A1 | | 7/2010 |
| EP | 2207227 A1 | | 7/2010 |
| EP | 2219251 A1 | | 8/2010 |
| EP | 2533333 A1 | | 12/2012 |
| JP | 4-328277 A | | 11/1992 |
| JP | 6-275274 A | | 9/1994 |
| JP | 7-29603 A | | 1/1995 |
| JP | 7-211311 A | | 8/1995 |
| JP | 8-138669 A | | 5/1996 |
| JP | 8-213015 A | | 8/1996 |
| JP | 09-82325 A | | 3/1997 |
| JP | 9-120813 A | | 5/1997 |
| JP | 9-270257 A | | 10/1997 |
| JP | 10-83815 A | | 3/1998 |
| JP | 10-116618 A | | 5/1998 |
| JP | 10-188986 A | | 7/1998 |
| JP | 10-206322 A | | 8/1998 |
| JP | 10-208744 A | | 8/1998 |
| JP | 10-302779 A | | 11/1998 |
| JP | 10-321224 A | | 12/1998 |
| JP | 10-334919 A | | 12/1998 |
| JP | 11-16573 A | | 1/1999 |
| JP | 11-67205 A | | 3/1999 |
| JP | 11-273676 A | | 10/1999 |
| JP | 11-292542 A | | 10/1999 |
| JP | 11-307094 A | | 11/1999 |
| JP | 11-345615 A | | 12/1999 |
| JP | 2000-30693 A | | 1/2000 |
| JP | 2000-72445 A | | 3/2000 |
| JP | 2000-149945 A | | 5/2000 |
| JP | 2000-215884 A | | 8/2000 |
| JP | 2000-348721 A | | 12/2000 |
| JP | 2001-110420 A | | 4/2001 |
| JP | 2001-148249 A | | 5/2001 |
| JP | 2001-223008 A | | 8/2001 |
| JP | 2001-266851 A | | 9/2001 |
| JP | 2002-63901 A | | 2/2002 |
| JP | 2002-124261 A | | 4/2002 |
| JP | 3276183 B2 | | 4/2002 |
| JP | 2002-164053 A | | 6/2002 |
| JP | 2002-203552 A | | 7/2002 |
| JP | 2002-216745 A | | 8/2002 |
| JP | 2002-260655 A | | 9/2002 |
| JP | 2002-289261 A | | 10/2002 |
| JP | 2002-298914 A | | 10/2002 |
| JP | 3334179 B2 | | 10/2002 |
| JP | 2003-7299 A | | 1/2003 |
| JP | 2003-17052 A | | 1/2003 |
| JP | 2003-81637 A | | 3/2003 |
| JP | 2003-151546 A | | 5/2003 |
| JP | 2003-229129 A | | 8/2003 |
| JP | 2004-6264 A | | 1/2004 |
| JP | 2004-146374 A | | 5/2004 |
| JP | 2004-172109 A | | 6/2004 |
| JP | 2004-193115 A | | 7/2004 |
| JP | 2004-214187 A | | 7/2004 |
| JP | 2004-227790 A | | 8/2004 |
| JP | 2004-253169 A | | 9/2004 |
| JP | 2004-273451 A | | 9/2004 |
| JP | 2004-355824 A | | 12/2004 |
| JP | 2004-356094 A | | 12/2004 |
| JP | 2005-11713 A | | 1/2005 |
| JP | 2005-44743 A | | 2/2005 |
| JP | 2005-53764 A | | 3/2005 |
| JP | 2005-56602 A | | 3/2005 |
| JP | 2005-60162 A | | 3/2005 |
| JP | 2005-75691 A | | 3/2005 |
| JP | 2005-183366 A | | 7/2005 |
| JP | 2005-225734 A | | 8/2005 |
| JP | 2005-235624 A | | 9/2005 |
| JP | 2005-243636 A | | 9/2005 |
| JP | 2005-251700 A | | 9/2005 |
| JP | 2005-285572 A | | 10/2005 |
| JP | 2005-289700 A | | 10/2005 |

(56) References Cited

FOREIGN PATENT DOCUMENTS

| | | |
|---|---|---|
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 2008-282613 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 20091128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.

Journal of the Electrochemical Society, 155 (3), 2008, pp. A239-A245, "Storage Characteristics of LiNi0.8Co0.1 +xMn0.1-xO2 (x+32 0, 0.03, and 0.06) Cathode Materials for Lithium Ion Batteries", Eom, et al.

Machine English translation for CN 1710735 (2005), 9 pages, European Patent Office, http://translationportal.epo.org . . . , retrieved from the internet Oct. 6, 2014.

Final Rejection mailed Sep. 18, 2014 in co-pending U.S. Appl. No. 13/508,887.

Office Action mailed Sep. 18, 2014 in co-pending U.S. Appl. No. 13/856,514 .

Office Action mailed Oct. 9, 2014 in co-pending U.S. Appl. No. 13/695,663.

Office Action mailed Sep. 9, 2014 in co-pending U.S. Appl. No. 13/514,080.

Office Action mailed Oct. 2, 2014 in co-pending U.S. Appl. No. 13/582,089.

Office Action mailed Oct. 3, 2014 in co-pending U.S. Appl. No. 13/581,730.

European communication dated Oct. 27, 2014 in co-pending European patent application No. EP 10839166.5.

European communication dated Nov. 5, 2014 in co-pending European patent application No. EP 11856183.6.

European communication dated Oct. 20, 2014 in co-pending European patent application No. EP 12763420.2.

Office Action mailed Nov. 5, 2014 in co-pending U.S. Appl. No. 13/582,087.

Office Action mailed Nov. 14, 2014 in co-pending U.S. Appl. No. 13/582,096.

International Search Report mailed Jun. 6, 2010 in co-pending PCT Application No. PCT/JP2010/053443.

International Preliminary Report on Patentability mailed Nov. 17, 2011 in co-pending PCT application No. PCT/JP2010/053443.

International Search Report mailed May 24, 2011 in co-pending PCT application No. PCT/JP2011/053271.

International Preliminary Report on Patentability mailed Sep. 26, 2013 in co-pending PCT application No. PCT/JP2011/053271.

International Search Report/Written Opinion mailed Mar. 8, 2011 in co-pending PCT application No. PCT/JP2010/071723.

International Preliminary Report on Patentability mailed Jul. 12, 2012 in co-pending PCT application No. PCT/JP2010/071723.

International Search Report mailed Jan. 24, 2012 in co-pending PCT application No. PCT/JP2011/072860.

International Preliminary Report on Patentability mailed Oct. 10, 2013 in co-pending PCT application No. PCT/JP2011/072860.

International Search Report/Written Opinion mailed Jan. 25, 2011 in co-pending PCT application No. PCT/JP2010/071724.

International Preliminary Report on Patentability issued Jul. 10, 2012 in co-pending PCT application No. PCT/JP2010/071724.

International Search Report mailed Apr. 26, 2011 in co-pending PCT application No. PCT/JP2011/052394.

International Preliminary Report on Patentability mailed Oct. 11, 2012 in co-pending PCT application No. PCT/JP2011/052394.

European communication issued May 9, 2014 in co-pending European patent application No. EP 11739870.1.

International Search Report mailed May 10, 2011 in co-pending PCT application No. PCT/JP2011/052399.

International Preliminary Report on Patentability mailed Oct. 11, 2012 in co-pending PCT application No. PCT/JP2011/052399.

International Search Report mailed Nov. 15, 2011 in co-pending PCT application No. PCT/JP2011/069042.

International Preliminary Report on Patentability mailed Aug. 1, 2013 in co-pending PCT application No. PCT/JP2011/069042.

International Search Report/Written Opinion mailed Jun. 7, 2011 in co-pending PCT application No. PCT/JP2011/054935.

International Preliminary Report on Patentability mailed Oct. 11, 2012 in co-pending PCT application No. PCT/JP2011/054935.

(56) References Cited

OTHER PUBLICATIONS

Japanese Communication mailed Oct. 1, 2013 in co-pending Japanese patent application No. JP 2012-503253.
International Search Report mailed Jun. 7, 2011 in co-pending PCT application No. PCT/JP2011/054938.
International Preliminary Report on Patentability mailed Nov. 22, 2012 in co-pending PCT application No. PCT/JP2011/054938.
Japanese Communication mailed Oct. 1, 2013 in co-pending Japanese patent application No. JP 2012-503255.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
Japanese Communication mailed Oct. 1, 2013 in co-pending Japanese patent application No. JP 2012-503252.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Preliminary Report on Patentability mailed Nov. 22, 2012 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
Chinese communication dated May 12, 2014 in co-pending Chinese patent application No. CN 201180008573.3.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
European communication issued May 9, 2014 in co-pending European patent application No. EP 11750704.6.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
European communication issued May 22, 2014 in co-pending European patent application No. EP 11750705.3.
International Search Report mailed Nov. 1, 2011 in co-pending PCT application No. PCT/JP2011/066722.
International Preliminary Report on Patentability mailed Jun. 13, 2013 in co-pending PCT application No. PCT/JP2011/066722.
European communication issued May 6, 2014 in co-pending European patent application No. EP 11845955.1.
International Search Report mailed Apr. 10, 2012 in co-pending PCT application No. PCT/JP2011/079535.
International Search Report mailed Jun. 5, 2012 in co-pending PCT application No. PCT/JP2012/057974.
International Preliminary Report on Patentability mailed Oct. 10, 2013 in co-pending PCT application No. PCT/JP0212/057974.
Electrochimica Acta, vol. 51, 2006, pp. 5581-5586, "Preparation and electrochemical properties of LiCoO2-LiNi0.5Mn0.5O2-Li2MnO3 solid solutions with high Mn contents", Sun, et al.
International Journal of Inorganic Materials 3 (2001), pp. 323-329, "Structural and electrochemical properties of Li-Ni Co oxides synthesized by wet chemistry via a succinic-acid-assisted technique", Castro-Garcia, et al.
Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
International Search Report mailed Dec. 25, 2012 in corresponding PCT application No. PCT/JP2012/074263.
International Search Report mailed Dec. 25, 2012 in co-pending PCT application No. PCT/JP2012/074266.
International Search Report mailed Aug. 27, 2013 in co-pending PCT application No. PCT/JP2013/064941.
Office Action mailed Dec. 4, 2013 in co-pending U.S. Appl. No. 13/508,880.
Final Rejection mailed Jun. 18, 2014 in co-pending U.S. Appl. No. 13/508,880.
Office Action—Restriction—mailed Mar. 12, 2013 in co-pending U.S. Appl. No. 13/508,887.
Office Action mailed Jun. 10, 2013 in co-pending U.S. Appl. No. 13/508,887.
Final Rejection mailed Sep. 19, 2013 in co-pending U.S. Appl. No. 13/508,887.
Office Action mailed Sep. 17, 2013 in co-pending U.S. Appl. No. 13/856,514.
Final Rejection mailed Feb. 27, 2014 in co-pending U.S. Appl. No. 13/856,514.
Office Action mailed Jul. 16, 2013 in co-pending U.S. Appl. No. 13/514,080.
Office Action mailed Dec. 18, 2013 in co-pending U.S. Appl. No. 13/514,080.
Final Rejection mailed Jun. 3, 2014 in co-pending U.S. Appl. No. 13/514,080.
Office Action mailed Jul. 29, 2013 in co-pending U.S. Appl. No. 13/576,548.
Final Rejection mailed Jan. 9, 2014 in co-pending U.S. Appl. No. 13/576,548.
Office Action mailed Jul. 1, 2014 in co-pending U.S. Appl. No. 13/576,548.
Office Action mailed Jul. 8, 2014 in co-pending U.S. Appl. No. 13/576,753.
Office Action mailed Aug. 1, 2013 in co-pending U.S. Appl. No. 13/581,546.
Final Rejection mailed Jan. 27, 2014 in co-pending U.S. Appl. No. 13/581,546.
Office Action mailed Aug. 13, 2013 in co-pending U.S. Appl. No. 13/582,067.
Final Rejection mailed Jan. 24, 2014 in co-pending U.S. Appl. No. 13/582,067.
Office Action mailed Jul. 17, 2013 in co-pending U.S. Appl. No. 13/581,814.
Final Rejection mailed Jan. 27, 2014 in co-pending U.S. Appl. No. 13/581,814.
Office Action mailed Jun. 19, 2013 in co-pending U.S. Appl. No. 13/582,096.
Final Rejection mailed Feb. 20, 2014 in co-pending U.S. Appl. No. 13/582,096.
Office Action mailed Jul. 12, 2013 in co-pending U.S. Appl. No. 13/582,101.
Final Rejection mailed Feb. 7, 2014 in co-pending U.S. Appl. No. 13/582,101.
Office Action mailed Jul. 15, 2013 in co-pending U.S. Appl. No. 13/582,113.
Final Rejection mailed Feb. 18, 2014 in co-pending U.S. Appl. No. 13/582,113.
European Communication dated Jan. 5, 2015 in co-pending European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Search Report mailed Jan. 7, 2014 in co-pending PCT application No. PCT/JP2013/076598.

(56) References Cited

OTHER PUBLICATIONS

Journal of the the Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May, 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
Notice of Allowance mailed Jan. 15, 2015 in co-pending U.S. Appl. No. 13/514,080.
Final Rejection mailed Jan. 23, 2015 in co-pending U.S. Appl. No. 13/576,548.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Final Rejection mailed Feb. 12, 2015 in co-pending U.S. Appl. No. 13/582,089.
Final Rejection mailed Feb. 13, 2015 in co-pending U.S. Appl. No. 13/582,087.
Office Action mailed Feb. 25, 2015 in co-pending U.S. Appl. No. 13/508,880.
Final Rejection mailed Feb. 24, 2015 in co-pending U.S. Appl. No. 13/695,663.
Final Rejection mailed Feb. 27, 2015 in co-pending U.S. Appl. No. 13/581,730.
Office Action mailed Feb. 26, 2015 in co-pending U.S. Appl. No. 13/582,101.
Office Action mailed Feb. 26, 2015 in co-pending U.S. Appl. No. 13/582,113.
Japanese communication mailed Apr. 7, 2015 in co-pending Japanese patent application No. 2012-503258.
International Preliminary Report on Patentability mailed Mar. 19, 2015 in co-pending PCT application No. PCT/JP2013/064941.
International Preliminary Report on Patentability mailed Apr. 2, 2015 in co-pending PCT application No. PCT/JP2013/076598.
Office Action mailed Mar. 25, 2015 in co-pending U.S. Appl. No. 13/581,423.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed May 14, 2015 in co-pending U.S. Appl. No. 13/984,947.
Office Action mailed Apr. 3, 2013 in co-pending U.S. Appl. No. 14/364,809.
Office Action mailed Apr. 3, 2015 in co-pending U.S. Appl. No. 14/364,830.
Office Action mailed Aug. 14, 2015 in co-pending U.S. Appl. No. 13/822,447.
Final Rejection mailed Jul. 29, 2015 in co-pending U.S. Appl. No. 13/508,880.
Office Action mailed Jun. 4, 2015 in co-pending U.S. Appl. No. 13/695,663.
Notice of Allowance mailed Jun. 30, 2015 in co-pending U.S. Appl. No. 13/576,548.
Notice of Allowance mailed May 20, 2015 in co-pending U.S. Appl. No. 13/582,087.
Final Rejection mailed Jun. 23, 2015 in co-pending U.S. Appl. No. 13/582,096.
Final Rejection mailed Jul. 1, 2015 in co-pending U.S. Appl. No. 13/582,101.
Final Rejection mailed Jun. 30, 2015 in co-pending U.S. Appl. No. 13/582,113.
Final Rejection mailed Jun. 24, 2015 in co-pending U.S. Appl. No. 13/816,822.
Notice of Allowance mailed Aug. 26, 2015 in co-pending U.S. Appl. No. 13/695,663.
Notice of Allowance mailed Sep. 10, 2015 in co-pending U.S. Appl. No. 13/576,753.
Notice of Allowance mailed Sep. 22, 2015 in co-pending U.S. Appl. No. 13/582,096.
Notice of Allowance mailed Oct. 22, 2015 in co-pending U.S. Appl. No. 13/582,101.
Notice of Allowance mailed Oct. 22, 2015 in co-pending U.S. Appl. No. 13/582,113.
Notice of Allowance mailed Oct. 21, 2015 in co-pending U.S. Appl. No. 13/984,947.
Notice of Allowance mailed Sep. 10, 2015 in co-pending U.S. Appl. No. 14/364,809.

\* cited by examiner

CATHODE ACTIVE MATERIAL FOR LITHIUM ION BATTERY, CATHODE FOR LITHIUM ION BATTERY, AND LITHIUM ION BATTERY

TECHNICAL FIELD

The present invention relates to a cathode active material for a lithium ion battery, a cathode for a lithium ion battery, and a lithium ion battery.

BACKGROUND ART

For cathode active materials for lithium ion batteries, lithium-containing transition metal oxides are usually used. The lithium-containing transition metal oxides are specifically lithium cobaltate ($LiCoO_2$), lithium nickelate ($LiNiO_2$), lithium manganate ($LiMn_2O_4$), and the like, and making these into a composite has been progress in order to improve properties (capacity enhancement, cycle properties, preservation properties, internal resistance reduction, and rate characteristic) and enhance safety. For lithium ion batteries in large-size applications as for vehicles and road leveling, properties different from those for cellular phones and personal computers hitherto are demanded.

For the improvement of battery properties, various methods have conventionally been used, and for example, Patent Literature 1 discloses a production method of a cathode material for a lithium secondary battery, in which method a lithium nickel composite oxide represented by a composition of $$Li_xNi_{1-y}M_yO_{2-\delta}$$

wherein $0.8 \leq x \leq 1.3$ and $0 < y \leq 0.5$; M denotes at least one element selected from the group consisting of Co, Mn, Fe, Cr, V, Ti, Cu, Al, Ga, Bi, Sn, Zn, Mg, Ge, Nb, Ta, Be, B, Ca, Sc, and Zr; and δ corresponds to an amount of oxygen deficiency or an amount of oxygen excess, and $-0.1 < \delta < 0.1$ is passed through a classifying machine to be separated into the oxide having large particle diameters and the oxide having small particle diameters at an equilibrium separation particle diameter Dh of 1 to 10 μm, and the oxide having large particle diameters and the oxide having small particle diameters are blended at a weight ratio of 0:100 to 100:0. Then, the Patent Literature states that a cathode material for a lithium ion battery having various balances between rate characteristic and capacity can easily be produced.

CITATION LIST

Patent Literature

[Patent Literature 1] Japanese Patent No. 4175026

SUMMARY OF INVENTION

Technical Problem

Although the lithium nickel composite oxide stated in Patent Literature 1 contains an excessive amount of oxygen in the composition formula, there is still room for improvement as a high-quality cathode active material for a lithium ion battery.

Then, an object of the present invention is to provide a cathode active material for a lithium ion battery having good battery properties.

Solution to Problem

As a result of exhaustive studies, the present inventor has found that a close correlation exists between the amount of oxygen in a cathode active material and the battery properties. That is, it has been found that good battery properties can be obtained when the amount of oxygen in a cathode active material is a certain value or larger.

It has also been found that a close correlation exists between the moisture content and further the amount of moisture absorption of a cathode active material, and the battery properties. That is, it has been found that particularly good battery properties can be obtained when the moisture content in a cathode active material is a certain value or lower, or further when the amount of moisture absorption of a cathode active material is a certain value or lower.

An aspect of the present invention completed based on the above-mentioned findings is a cathode active material for a lithium ion battery represented by a composition formula:

$$Li_xNi_{1-y}M_yO_{2+\alpha}$$

wherein M is one or more selected from Sc, Ti, V, Cr, Mn, Fe, Co, Cu, Zn, Ga, Ge, Al, Bi, Sn, Mg, Ca, B, and Zr; $0.9 \leq x \leq 1.2$; $0 < y \leq 0.7$; and $\alpha > 0.1$, wherein a moisture content measured by Karl Fischer titration at 300° C. is 1100 ppm or lower.

In an embodiment of the cathode active material for a lithium ion battery according to the present invention, the moisture content measured by Karl Fischer titration at 300° C. is 800 ppm or lower.

In another embodiment of the cathode active material for a lithium ion battery according to the present invention, M is one or more selected from Mn and Co.

In further another embodiment of the cathode active material for a lithium ion battery according to the present invention, $\alpha > 0.15$ in the composition formula.

In further another embodiment of the cathode active material for a lithium ion battery according to the present invention, $\alpha > 0.20$ in the composition formula.

In further another embodiment of the cathode active material for a lithium ion battery according to the present invention, a moisture content measured by Karl Fischer titration at 150° C. is 300 ppm or lower.

In further another embodiment of the cathode active material for a lithium ion battery according to the present invention, the moisture content measured by Karl Fischer titration at 150° C. is 200 ppm or lower.

In further another embodiment of the cathode active material for a lithium ion battery according to the present invention, a difference between a moisture content measured by Karl Fischer titration at 300° C. and a moisture content measured by Karl Fischer titration at 150° C. is 100 to 500 ppm.

In further another embodiment of the cathode active material for a lithium ion battery according to the present invention, the difference between a moisture content measured by Karl Fischer titration at 300° C. and a moisture content measured by Karl Fischer titration at 150° C. is 100 to 130 ppm.

In further another embodiment of the cathode active material for a lithium ion battery according to the present invention, a moisture content measured by Karl Fischer titration at 150° C. is 1500 ppm or lower after the cathode active material is left in the air at a humidity of 50% and at 25° C. for 24 hours.

In further another embodiment of the cathode active material for a lithium ion battery according to the present invention, the moisture content measured by Karl Fischer titration at 150° C. is 1200 ppm or lower after the cathode active material is left in the air at a humidity of 50% and at 25° C. for 24 hours.

In further another embodiment of the cathode active material for a lithium ion battery according to the present invention, a moisture content measured by Karl Fischer titration at 150° C. is 300 ppm or lower after the cathode active material is left at a dew point of −80° C. for 24 hours.

In further another embodiment of the cathode active material for a lithium ion battery according to the present invention, the moisture content measured by Karl Fischer titration at 150° C. is 200 ppm or lower after the cathode active material is left at a dew point of −80° C. for 24 hours.

Another aspect of the present invention is a cathode for a lithium ion battery using the cathode active material for a lithium ion battery according to the present invention.

Further another aspect of the present invention is a lithium ion battery using the cathode for a lithium ion battery according to the present invention.

Advantageous Effect of Invention

The present invention can provide a cathode active material for a lithium ion battery having good battery properties.

DESCRIPTION OF EMBODIMENTS (Constitution of a Cathode Active Material for a Lithium Ion Battery)

As a material for the cathode active material for a lithium ion battery according to the present invention, compounds useful as cathode active materials for usual cathodes for lithium ion batteries can broadly be used, but particularly lithium-containing transition metal oxides such as lithium cobaltate ($LiCoO_2$), lithium nickelate ($LiNiO_2$), and lithium manganate ($LiMn_2O_4$) are preferably used. A cathode active material for a lithium ion battery according to the present invention produced using such a material is represented by a composition formula:

$$Li_xNi_{1-y}M_yO_{2+\alpha}$$

wherein M is one or more selected from Sc, Ti, V, Cr, Mn, Fe, Co, Cu, Zn, Ga, Ge, Al, Bi, Sn, Mg, Ca, B, and Zr; 0.9≤x≤1.2; 0<y≤0.7; and α>0.1.

The ratio of lithium to the whole metal in the cathode active material for a lithium ion battery is 0.9 to 1.2; and this is because with the ratio of lower than 0.9, a stable crystal structure can hardly be held, and with the ratio exceeding 1.2, a high capacity of the battery cannot be secured.

The cathode active material for a lithium ion battery according to the present invention excessively contains oxygen as indicated as $O_{2+\alpha}$ (α>0.1) in the composition formula; and in the case of using the cathode active material for a lithium ion battery, battery properties such as capacity, rate characteristic, and capacity retention rate become good. Here, α is preferably α>0.15, and more preferably α>0.20.

The cathode active material for a lithium ion battery according to the present invention is a cathode active material for a lithium ion battery, the active material having a moisture content as measured by Karl Fischer titration (JIS K0113, general rules for methods of potentiometric, amperometric, coulometric, and Karl Fischer titrations) at 300° C. of 1100 ppm or lower. Karl Fischer's method is a method of measuring moisture by using a Karl Fischer's reagent (constituted of iodine, sulfur dioxide, a base, and a solvent such as an alcohol) to selectively and quantitatively react with water as in the following formula.

$$I_2+SO_2+3\ Base+ROH+H_2O \rightarrow 2\ Base+HI+Base+HSO_4R$$

A sample is added to an electrolyte solution containing as main components an iodide ion, sulfur dioxide, a base, and a solvent such as an alcohol, and electrolytically oxidized to thereby generate iodine as in the following formula and to thereby immediately cause Karl Fischer reaction.

$$2I^{2-}-2e \rightarrow I_2$$

Since iodine is generated in proportion to an electricity quantity based on "Faraday's law," the amount of moisture can be determined immediately from the electricity quantity required for the electrolytic oxidation (1 mg of water=10.71 coulombs).

If a cathode active material for a lithium ion battery contains an amount of moisture exceeding a predetermined amount, battery properties of the lithium ion battery using the cathode active material become poor. As seen in the cathode active material for a lithium ion battery according to the present invention, if the moisture content measured by Karl Fischer titration at 300° C. is 1100 ppm or lower, battery properties, such as cycle properties, high-temperature operation, and storage properties, of a lithium ion battery using the cathode active material become good. The moisture content measured by Karl Fischer titration at 300° C. is preferably 800 ppm or lower, and more preferably 300 ppm or lower.

The cathode active material for a lithium ion battery according to the present invention, further, preferably has a moisture content measured by Karl Fischer titration at 150° C. of 300 ppm or lower. If the moisture content measured by Karl Fischer titration at 150° C. is 300 ppm or lower, battery properties, such as cycle properties, high-temperature operation, and storage properties, of a lithium ion battery using the cathode active material become better. The moisture content measured by Karl Fischer titration at 150° C. is preferably 200 ppm or lower, and more preferably 120 ppm or lower.

In the cathode active material for a lithium ion battery according to the present invention, a difference between a moisture content measured by Karl Fischer titration at 300° C. and a moisture content measured by Karl Fischer titration at 150° C. is preferably 100 to 500 ppm. If the difference in the moisture content therebetween is 100 to 500 ppm, the cycle properties of a lithium ion battery using the cathode active material become good. The difference between a moisture content measured by Karl Fischer titration at 300° C. and a moisture content measured by Karl Fischer titration at 150° C. is more preferably 100 to 170 ppm, and still more preferably 100 to 130 ppm.

The cathode active material for a lithium ion battery according to the present invention preferably has a moisture content measured by Karl Fischer titration at 150° C. of 1500 ppm or lower after the cathode active material is left in the air at a humidity of 50% and at 25° C. for 24 hours. By allowing the cathode active material to have such a property, the cathode active material hardly absorbs moisture even if being stored in a high-humidity space, and the moisture content can well be controlled. The moisture content measured by Karl Fischer titration at 150° C. after the cathode active material is left in the air at a humidity of 50% and at 25° C. for 24 hours is more preferably 1200 ppm or lower, and still more preferably 700 ppm or lower.

The cathode active material for a lithium ion battery according to the present invention preferably has a moisture content measured by Karl Fischer titration at 150° C. of 300 ppm or lower after the cathode active material is left at a dew point of −80° C. for 24 hours. The reason of measuring at a dew point of −80° C. is because the measurement is carried out so as not to be influenced by the amount of moisture in the measurement environment. By allowing the cathode active material to have such a property, the cathode active material hardly absorbs moisture even if being stored in a space whose temperature is lower by 80° C. than the dew point, and the moisture content can well be controlled. The moisture content measured by Karl Fischer titration at 150° C. after the cathode active material is left at the dew point of −80° C. for 24 hours is more preferably 200 ppm or lower, and still more preferably 120 ppm or lower.

A cathode active material for a lithium ion battery is constituted of primary particles and secondary particles formed by aggregation of primary particles, or a mixture of primary particles and secondary particles. In the cathode active material for a lithium ion battery, the average particle diameter of the primary particles or the secondary particles is preferably 2 to 15 μm.

If the average particle diameter is smaller than 2 μm, the application of the cathode active material on a current collector becomes difficult. If the average particle diameter is larger than 15 μm, voids are liable to be generated in the filling time, leading to a decrease in the filling property. The average particle diameter is more preferably 3 to 10 μm.

(Constitutions of a Cathode for a Lithium Ion Battery and a Lithium Ion Battery Using the Cathode)

A cathode for a lithium ion battery according to an embodiment of the present invention has a structure in which a cathode mixture prepared by mixing, for example, the cathode active material for a lithium ion battery having the above-mentioned constitution, an electroconductive aid, and a binder is provided on one surface or both surfaces of a current collector composed of an aluminum foil or the like. Further a lithium ion battery according to an embodiment of the present invention has a cathode for a lithium ion battery having such a constitution.

(Method for Producing a Cathode Active Material for a Lithium Ion Battery)

Then, a method for producing a cathode active material for a lithium ion battery according to an embodiment of the present invention will be described in detail.

First, a metal salt solution is prepared. The metals are Ni, and one or more selected from Sc, Ti, V, Cr, Mn, Fe, Co, Cu, Zn, Ga, Ge, Al, Bi, Sn, Mg, Ca, B, and Zr. The metal salts are sulfate salts, chlorides, nitrate salts, acetate salts, or the like, and are especially preferably nitrate salts. This is because even if there occurs mingling thereof as impurities in a firing raw material, since the nitrate salts can be fired as they are, a washing step can be omitted, and because the nitrate salts function as an oxidizing agent and have a function of promoting the oxidization of the metals in the firing raw material. Each metal contained in the metal salts is adjusted so as to be in a desired molar ratio. The molar ratio of the each metal in a cathode active material is thereby determined.

Then, lithium carbonate is suspended in pure water; and the metal salt solution of the above metals is charged therein to thereby prepare a metal carbonate salt solution slurry. At this time, microparticulate lithium-containing carbonate salts are deposited in the slurry.

In the case where lithium compounds such as of the sulfate salts and the chlorides as the metal salts do not react in a heat treatment, the deposited microparticles are washed with a saturated lithium carbonate solution, and thereafter filtered out. In the case where lithium compounds such as of the nitrate salts and the acetate salts react in the heat treatment as a lithium raw material, the deposited microparticles are not washed, and filtered out as they are, and dried to thereby make a firing precursor.

Then, the filtered-out lithium-containing carbonate salts are dried to thereby obtain a powder of a composite material (precursor for a lithium ion battery cathode material) of lithium salts.

Then, a firing vessel having a predetermined volume is prepared; and the powder of the precursor for a lithium ion battery cathode material is filled in the firing vessel. Then, the firing vessel filled with the powder of the precursor for a lithium ion battery cathode material is transferred into a firing oven, and the powder is fired. The firing is carried out by holding the heating for a predetermined time in an oxygen atmosphere. If the firing is carried out under pressure of 101 to 202 kPa, since the amount of oxygen in the composition increases, the firing is preferable.

Thereafter, the powder is taken out from the firing vessel, and crushed by using a commercially available crusher or the like to thereby obtain a powder of a cathode active material. The crushing is carried out so as not to generate as few micro powders as possible by suitably regulating the crushing strength and the crushing time specifically so that micro powder of 4 μm or smaller in particle diameter is 10% or less in terms of volume fraction, or so that the specific surface area of the powder becomes 0.40 to 0.70 m$^2$/g.

By controlling the generation of micro powder in the crushing time in such a manner, since the surface area of the powder per volume decreases, the area of the powder exposed to the air can be suppressed. Therefore, the moisture absorption of the power of the precursor in the storing time and the like can well be suppressed.

EXAMPLES

Hereinafter, Examples are provided in order to well understand the present invention and its advantages, but the present invention is not limited to these Examples.

Examples 1 to 17

Lithium carbonate in an amount of charging shown in Table 1 was suspended in 3.2 L of pure water, and thereafter, 4.8 L of a metal salt solution was charged therein. Here, the metal salt solution was prepared by adjusting a hydrate of a nitrate salt of each metal so that the each metal was at a compositional ratio shown in Table 1, and so that the number of moles of the whole metal became 14 moles.

The amount of lithium carbonate suspended was such an amount that x in $Li_xNi_{1-y}M_yO_{2+\alpha}$ of a product (lithium ion secondary battery cathode material, that is, a cathode active material) became a value in Table 1, which was calculated by the following expression.

$$W(g) = 73.9 \times 14 \times (1+0.5x) \times A$$

In the above expression, "A" is a multiplying numerical value involving, in addition to an amount necessary for the deposition reaction, previously subtracting an amount of lithium of lithium compounds excluding lithium carbonate remaining in the raw material after the filtering from the amount of suspension. "A" is 0.9 in the case where lithium salts such as of the nitrate salts and the acetate salts reacts as a firing raw material, and 1.0 in the case where lithium salts such as of the sulfate salts and the chlorides do not react as a firing raw material.

The microparticulate lithium-containing carbonate salts thus deposited in the solution by this treatment, and the deposits were filtered out using a filter press.

Then, the deposits were dried to thereby obtain a lithium-containing carbonate salt (precursor for a lithium ion battery cathode material).

Then, a firing vessel was prepared, and the lithium-containing carbonate salt was filled in the firing vessel. Then, the firing vessel was put in an oxygen-atmosphere oven in the atmospheric pressure, and heated and held at a firing temperature shown in Table 1 for 10 hours, and then cooled to thereby obtain an oxide.

Then, the obtained oxide was crushed using a pulverizing machine so that the micro powder of 3 μm or smaller in particle diameter had a predetermined volume fraction after the crushing, to thereby obtain a powder for a lithium ion secondary battery cathode material.

Example 18

In Example 18, the same process was carried out as in Examples 1 to 17, except for using a composition shown in Table 1 of each metal as the raw material, using chlorides as the metal salts, and washing the deposit with a saturated lithium carbonate solution and filtering the resultant after a lithium-containing carbonate salt was deposited.

Example 19

In Example 19, the same process was carried out as in Examples 1 to 17, except for using a composition shown in Table 1 of each metal as the raw material, using sulfate salts as the metal salts, and washing the deposit with a saturated lithium carbonate solution and filtering the resultant after a lithium-containing carbonate salt was deposited.

Example 20

In Example 20, the same process was carried out as in Examples 1 to 17, except for using a composition shown in Table 1 of each metal as the raw material, and carrying out the firing under pressure of 120 kPa in place of the atmospheric pressure.

Example 21

In Example 21, the same process was carried out as in Examples 1 to 17, except for using a composition shown in Table 1 of each metal as the raw material, and carrying out the crushing step in an atmosphere of a humidity of 60% or lower.

Comparative Examples 1 to 3

In Comparative Examples 1 to 3, the same process was carried out as in Examples 1 to 17, except for using a composition shown in Table 1 of each metal as the raw material, and carrying out no regulation as in Examples 1 to 17 of the crushing of the oxide as the final step.

Comparative Examples 4 to 6

In Comparative Examples 4 to 6, the same process was carried out as in Comparative Example 1, except for using a composition shown in Table 1 of each metal as the raw material, and carrying out the firing step in an air-atmosphere oven in place of the oxygen-atmosphere oven.

(Evaluations)

—Evaluation of a Cathode Material Composition—

The metal content of a cathode material was measured by an inductively coupled plasma atomic emission spectrometer (ICP-OES), and the compositional ratio (molar ratio) of each metal was calculated. The oxygen content was measured by a LECO method, and a was calculated. These numerical values were as shown in Table 1.

—Evaluation of an Average Particle Diameter—

A powder of each cathode material was sampled, and the average particle diameter was measured by a particle size distribution measuring device.

—Evaluation (1) of a Moisture Content—

A powder of each cathode material was stored in a closed state of a desiccator placed at room temperature; and the powder was suitably taken out and subjected to Karl Fischer titration with the titration speed being regulated at 0.15 mL/min under observation of a flowmeter of a vaporization apparatus to thereby measure moisture contents at 300° C. and 150° C. The measurement was carried out in a glove box filled with nitrogen gas. 50 mL of dehydrated ethanol and 100 mL of AQUALYTE RSA (made by Kanto Chemical Co., Inc.) were injected in an electrolytic cell. 15 mL of AQUALYTE CN (made by Kanto Chemical Co., Inc.) was injected in a counter electrode cell.

—Evaluation (2) of a Moisture Content—

A powder of each cathode material was left in the air at a humidity of 50% and at 25° C. for 24 hours, and immediately subjected to Karl Fischer titration with the titration speed being regulated at 0.15 mL/min under observation of a flowmeter of a vaporization apparatus to thereby measure a moisture content at 150° C. The measurement was carried out in a glove box filled with nitrogen gas. 50 mL of dehydrated ethanol and 100 mL of AQUALYTE RSA (made by Kanto Chemical Co., Inc.) were injected in an electrolytic cell. 15 mL of AQUALYTE CN (made by Kanto Chemical Co., Inc.) was injected in a counter electrode cell.

—Evaluation (3) of a Moisture Content—

A powder of each cathode material was left at a dew point of −80° C. for 24 hours, and immediately subjected to Karl Fischer titration with the titration speed being regulated at 0.15 mL/min under observation of a flowmeter of a vaporization apparatus to thereby measure a moisture content at 150° C. The measurement was carried out in a glove box filled with nitrogen gas. 50 mL of dehydrated ethanol and 100 mL of AQUALYTE RSA (made by Kanto Chemical Co., Inc.) were injected in an electrolytic cell. 15 mL of AQUALYTE CN (made by Kanto Chemical Co., Inc.) was injected in a counter electrode cell.

—Evaluation of Battery Properties—

Each cathode material, an electroconductive material, and a binder were weighed in a proportion of 85:8:7; the cathode material and the electroconductive material were mixed with a solution in which the binder was dissolved in an organic solvent (N-Methylpyrrolidone) to thereby make a slurry; and the slurry was applied on an Al foil, dried, and thereafter pressed to thereby make a cathode. Then, a 2032-type coin cell with Li as a counter electrode for evaluation was fabricated; and a discharge capacity at a current density of 0.2 C was measured using an electrolyte solution in which 1 M-$LiPF_6$ was dissolved in EC-DMC (1:1). Further a rate characteristic was acquired by calculating the ratio of a discharge capacity at a current density of 2 C to a battery capacity at a current density of 0.2 C. A capacity retention rate was measured by comparing an initial discharge capacity obtained at room temperature at a discharge current of 1 C and a discharge capacity after 100 cycles.

These results are shown in Tables 1 and 2.

TABLE 1

| | Amount of Lithium Carbonate Suspended | Compositional Ratio of Each Metal in Whole Metal Excluding Li | | | | | | | | | | Holding Temperature | | | Micro powder of 3 μm or Smaller in Particle Diameter after Crushing |
|---|---|---|---|---|---|---|---|---|---|---|---|---|---|---|---|
| | (g) | Ni | Co | Mn | Ti | Cr | Fe | Cu | Al | Sn | Mg | (° C.) | x | α | (vol %) |
| Example 1 | 1393 | 33.3 | 33.3 | 33.3 | | | | | | | | 1000 | 1 | 0.15 | 6.2 |
| Example 2 | 1393 | 33.3 | 33.3 | 33.3 | | | | | | | | 1000 | 1 | 0.12 | 5.2 |
| Example 3 | 1393 | 33.3 | 33.3 | 33.3 | | | | | | | | 1000 | 1 | 0.15 | 4.9 |
| Example 4 | 1393 | 33.3 | 33.3 | 33.3 | | | | | | | | 1000 | 1 | 0.14 | 4.3 |
| Example 5 | 1442 | 33.3 | 33.3 | 33.3 | | | | | | | | 970 | 1.025 | 0.17 | 6.3 |
| Example 6 | 1393 | 33.3 | 33.3 | 33.3 | | | | | | | | 950 | 1.05 | 0.19 | 5.3 |
| Example 7 | 1393 | 33 | 33 | 33 | | | | | | 1 | | 1000 | 1 | 0.11 | 4.9 |
| Example 8 | 1393 | 60 | 15 | 25 | | | | | | | | 920 | 1 | 0.17 | 6.1 |
| Example 9 | 1393 | 60 | 15 | 25 | | | | | | | | 900 | 1 | 0.15 | 6.8 |
| Example 10 | 1393 | 80 | 10 | 10 | | | | | | | | 900 | 1 | 0.12 | 6 |
| Example 11 | 1393 | 80 | 10 | 10 | | | | | | | | 900 | 1.01 | 0.10 | 6 |
| Example 12 | 1393 | 80 | 10 | 10 | | | | | | | | 800 | 1 | 0.11 | 4.9 |
| Example 13 | 1393 | 80 | 15 | | 2.5 | | | | | | 2.5 | 800 | 1 | 0.13 | 6.7 |
| Example 14 | 1393 | 80 | 15 | | | 5 | | | | | | 800 | 1 | 0.11 | 6.2 |
| Example 15 | 1393 | 80 | 15 | | | | 5 | | | | | 800 | 1 | 0.21 | 6.6 |
| Example 16 | 1393 | 80 | 15 | | | | | 5 | | | | 800 | 1 | 0.11 | 6.2 |
| Example 17 | 1393 | 80 | 15 | | | | | | 5 | | | 750 | 1.01 | 0.13 | 6.1 |
| Example 18 | 1393 | 33.3 | 33.3 | 33.3 | | | | | | | | 1000 | 1 | 0.13 | 6.8 |
| Example 19 | 1393 | 33.3 | 33.3 | 33.3 | | | | | | | | 1000 | 1 | 0.10 | 6.9 |
| Example 20 | 1393 | 33.3 | 33.3 | 33.3 | | | | | | | | 950 | 1 | 0.23 | 4.1 |
| Example 21 | 1393 | 80 | 10 | 10 | | | | | | | | 900 | 0.99 | 0.12 | 4 |
| Comparative Example 1 | 1393 | 33.3 | 33.3 | 33.3 | | | | | | | | 1000 | 1 | 0.18 | 8.1 |
| Comparative Example 2 | 1393 | 60 | 15 | 25 | | | | | | | | 920 | 1 | 0.09 | 8.3 |
| Comparative Example 3 | 1393 | 80 | 10 | 10 | | | | | | | | 800 | 1 | 0.12 | 9 |
| Comparative Example 4 | 1393 | 80 | 10 | 10 | | | | | | | | 800 | 1 | −0.01 | 8 |
| Comparative Example 5 | 1393 | 80 | 15 | | | | | 5 | | | | 800 | 1 | −0.01 | 8.6 |
| Comparative Example 6 | 1393 | 80 | 15 | | 2.5 | | | | | | 2.5 | 800 | 1.01 | 0.00 | 7.8 |

TABLE 2

| | Average Particle Diameter (μm) | Moisture Content (a) at 300° C. (ppm) | Moisture Content (b) at 150° C. (ppm) | a − b (ppm) | Moisture Content at 150° C. after being Left at a Humidity of 50% at 25° C. for 24 hours (ppm) | Moisture Content at 150° C. after being Left at a Dew Point of −80° C. for 24 hours (ppm) | Discharge Capacity (mAh/g) | Rate Characteristic (%) | Capacity Retention Rate (%) |
|---|---|---|---|---|---|---|---|---|---|
| Example 1 | 6.2 | 260 | 130 | 130 | 650 | 150 | 153 | 92 | 92 |
| Example 2 | 8.1 | 230 | 90 | 140 | 800 | 150 | 154 | 92 | 91 |
| Example 3 | 10.2 | 240 | 100 | 140 | 700 | 200 | 157 | 95 | 92 |
| Example 4 | 9.7 | 240 | 90 | 150 | 700 | 200 | 155 | 95 | 93 |
| Example 5 | 5.1 | 250 | 110 | 140 | 700 | 150 | 155 | 93 | 92 |
| Example 6 | 9 | 290 | 160 | 130 | 800 | 150 | 160 | 92 | 89 |
| Example 7 | 10.1 | 290 | 120 | 170 | 800 | 200 | 158 | 92 | 88 |
| Example 8 | 10 | 280 | 160 | 120 | 650 | 200 | 175 | 88 | 87 |
| Example 9 | 7.9 | 250 | 130 | 120 | 700 | 200 | 172 | 89 | 88 |
| Example 10 | 7.9 | 750 | 400 | 350 | 950 | 350 | 185 | 87 | 84 |
| Example 11 | 8.3 | 1050 | 550 | 500 | 1000 | 300 | 185 | 86 | 82 |
| Example 12 | 10 | 250 | 150 | 130 | 800 | 250 | 195 | 87 | 85 |
| Example 13 | 9.5 | 290 | 160 | 130 | 900 | 200 | 185 | 87 | 85 |
| Example 14 | 10 | 270 | 140 | 130 | 800 | 200 | 186 | 88 | 84 |
| Example 15 | 8.7 | 290 | 160 | 130 | 700 | 200 | 187 | 87 | 84 |
| Example 16 | 7.8 | 270 | 130 | 140 | 700 | 200 | 180 | 88 | 83 |
| Example 17 | 10.7 | 260 | 130 | 130 | 800 | 150 | 190 | 89 | 85 |
| Example 18 | 9 | 260 | 120 | 130 | 700 | 150 | 153 | 90 | 87 |
| Example 19 | 9 | 280 | 140 | 140 | 800 | 150 | 151 | 90 | 86 |
| Example 20 | 9.4 | 280 | 140 | 140 | 800 | 150 | 156 | 95 | 93 |
| Example 21 | 8 | 240 | 130 | 110 | 600 | 120 | 190 | 92 | 92 |
| Comparative Example 1 | 7 | 1200 | 500 | 700 | 2500 | 450 | 153 | 88 | 85 |
| Comparative Example 2 | 10 | 1200 | 600 | 600 | 3000 | 400 | 165 | 83 | 78 |
| Comparative Example 3 | 11 | 1400 | 600 | 700 | 2000 | 400 | 180 | 83 | 82 |
| Comparative Example 4 | 9 | 1500 | 700 | 800 | 1300 | 400 | 170 | 80 | 78 |

TABLE 2-continued

|  | Average Particle Diameter (μm) | Moisture Content (a) at 300° C. (ppm) | Moisture Content (b) at 150° C. (ppm) | a − b (ppm) | Moisture Content at 150° C. after being Left at a Humidity of 50% at 25° C. for 24 hours (ppm) | Moisture Content at 150° C. after being Left at a Dew Point of −80° C. for 24 hours (ppm) | Discharge Capacity (mAh/g) | Rate Characteristic (%) | Capacity Retention Rate (%) |
|---|---|---|---|---|---|---|---|---|---|
| Comparative Example 5 | 10 | 1300 | 500 | 800 | 1200 | 400 | 165 | 75 | 75 |
| Comparative Example 6 | 8.9 | 1200 | 550 | 650 | 1700 | 500 | 171 | 79 | 74 |

Any of Examples 1 to 21 could provide compositions prescribed in the present invention, and exhibited a moisture content measured by Karl Fischer titration at 300° C. of 1100 ppm or lower, and were good in any of the discharge capacity, the rate characteristic, and the capacity retention rate.

Comparative Examples 1 and 3 exhibited a moisture content exceeding 1100 ppm as measured by Karl Fischer titration at 300° C., and were poor in the rate characteristic and the capacity retention rate.

Comparative Examples 2, 4, 5, and 6 could not provide compositions prescribed in the present invention, and exhibited a moisture content exceeding 1100 ppm as measured by Karl Fischer titration at 300° C., and were poor in the rate characteristic and the capacity retention rate.

The invention claimed is:

1. A cathode active material for a lithium ion battery, represented by a composition formula:

$$Li_xNi_{1-y}M_yO_{2+\alpha}$$

wherein M is one or more selected from Sc, Ti, V, Cr, Mn, Fe, Co, Cu, Zn, Ga, Ge, Al, Bi, Sn, Mg, Ca, B, and Zr; $0.9 \leq x \leq 1.2$; $0 < y \leq 0.7$; and $\alpha > 0.1$, wherein a first moisture content measured by Karl Fischer titration at 300° C. is 1,100 ppm or lower and, a difference between the first moisture content measured by Karl Fischer titration at 300° C. and a second moisture content measured by Karl Fischer titration at 150° C. is 100 to 500 ppm;

further wherein a third moisture content measured by Karl Fischer titration at 150° C. is 300 ppm or lower after the cathode active material is left at a dew point of −80° C. for 24 hours.

2. The cathode active material for a lithium ion battery according to claim 1, wherein the first moisture content measured by Karl Fischer titration at 300° C. is 800 ppm or lower.

3. The cathode active material for a lithium ion battery according to claim 1, wherein the M is one or more selected from Mn and Co.

4. The cathode active material for a lithium ion battery according to claim 1, wherein $\alpha > 0.15$ in the composition formula.

5. The cathode active material for a lithium ion battery according to claim 4, wherein $\alpha > 0.20$ in the composition formula.

6. The cathode active material for a lithium ion battery according to claim 1, wherein the second moisture content measured by Karl Fischer titration at 150° C. is 300 ppm or lower.

7. The cathode active material for a lithium ion battery according to claim 6, wherein the second moisture content measured by Karl Fischer titration at 150° C. is 200 ppm or lower.

8. The cathode active material for a lithium ion battery according to claim 1, wherein the difference between the first moisture content measured by Karl Fischer titration at 300° C. and the second moisture content measured by Karl Fischer titration at 150° C. is 100 to 130 ppm.

9. The cathode active material for a lithium ion battery according to claim 1, wherein a fourth moisture content measured by Karl Fischer titration at 150° C. is 1500 ppm or lower after the cathode active material is exposed to air at a humidity of 50% and at 25° C. for 24 hours.

10. The cathode active material for a lithium ion battery according to claim 9, wherein the fourth moisture content measured by Karl Fischer titration at 150° C. is 1200 ppm or lower after the cathode active material is exposed to air at a humidity of 50% and at 25° C. for 24 hours.

11. The cathode active material for a lithium ion battery according to claim 1, wherein the third moisture content measured by Karl Fischer titration at 150° C. is 200 ppm or lower after the cathode active material is left at a dew point of −80° C. for 24 hours.

12. A cathode for a lithium ion battery, using a cathode active material for a lithium ion battery according to claim 1.

13. A lithium ion battery, using a cathode for a lithium ion battery according to claim 12.

* * * * *